Oct. 7, 1969   M. W. MARTIN, JR   3,470,582
APPARATUS FOR COMPACTING AND TRIMMING NECKS
IN BLOW MOLDED CONTAINERS
Filed July 9, 1965                                    2 Sheets-Sheet 1

INVENTOR
MERRITT W. MARTIN, JR.

BY *Olsen and Stephenson*
ATTORNEYS

INVENTOR
MERRITT W. MARTIN, JR.
BY Olsen and Stephenson
ATTORNEYS

United States Patent Office 3,470,582
Patented Oct. 7, 1969

3,470,582
APPARATUS FOR COMPACTING AND TRIMMING NECKS IN BLOW MOLDED CONTAINERS
Merritt W. Martin, Jr., Saline, Mich., assignor to Hoover Ball and Bearing Company, Saline, Mich., a corporation of Michigan
Filed July 9, 1965, Ser. No. 470,784
Int. Cl. B29c 5/06
U.S. Cl. 18—5                                                              11 Claims

ABSTRACT OF THE DISCLOSURE

A blow molding apparatus for forming articles from organic plastic material which includes a nozzle for extruding a plastic tubing and a sectional mold having a cavity adapted to receive the extruded tubing. The extrusion nozzle has an axially positioned blow pin mounted for axial reciprocation, and such blow pin has a head at its lower end for defining the internal diameter of the neck of a blown article. The head also has an outwardly projecting shoulder around its periphery located above the lower end thereof for defining the upper end of the neck of the blown article when the head is moved to the lower end of its stroke. The sectional mold has a neck portion which has at its lower end an inwardly projecting rim for cooperation with said shoulder in compacting plastic material in the neck of the article when said head is lowered. The sectional mold also has an inwardly converging portion above its neck portion for cooperation with said shoulder in trimming excess material from the upper end of the blown article when the head is lowered.

---

This invention relates generally to apparatus for blow molding plastic containers and more particularly to apparatus for compacting the plastic in the neck portion of such a container and trimming the neck of the container as an incident to the blow molding operation.

Many plastic containers, such as bottles, are formed with a neck which is relatively small in diameter compared to the diameter or width of the container. Consequently, difficulty has been encountered in blow molding containers of this type in providing sufficient plastic of requisite density in the neck portion of the mold to obtain a neck of the necessary strength. In addition, many of these containers have required a separate trimming operation following blow molding in order to remove excess plastic material from the container neck and provide a clean end on the neck. Such a separate trimming operation is undesirable for cost and quality control reasons. It is an object of this invention, therefore, to provide improved blow molding apparatus which is operable to compact plastic material in the container neck and trim the neck while the container is in the mold so that when the container is removed from the mold it has a rigid fully trimmed and finished neck and it is only necessary to deflash the container in order to place it in condition for filling. Such deflashing is readily accomplished either manually or automatically since the flash is readily broken off the container.

A further object of this invention is to provide apparatus of the above described type which is operative to shape the neck portion of the container so that when the plastic therein contracts as a result of cooling, the terminal end of the neck will be substantially flat for seating against a cap when it is applied to the neck.

Further objects, features and advantages of this invention will become apparent from a consideration of the following description, the appended claims, and the accompanying drawing in which:

Figure 1:
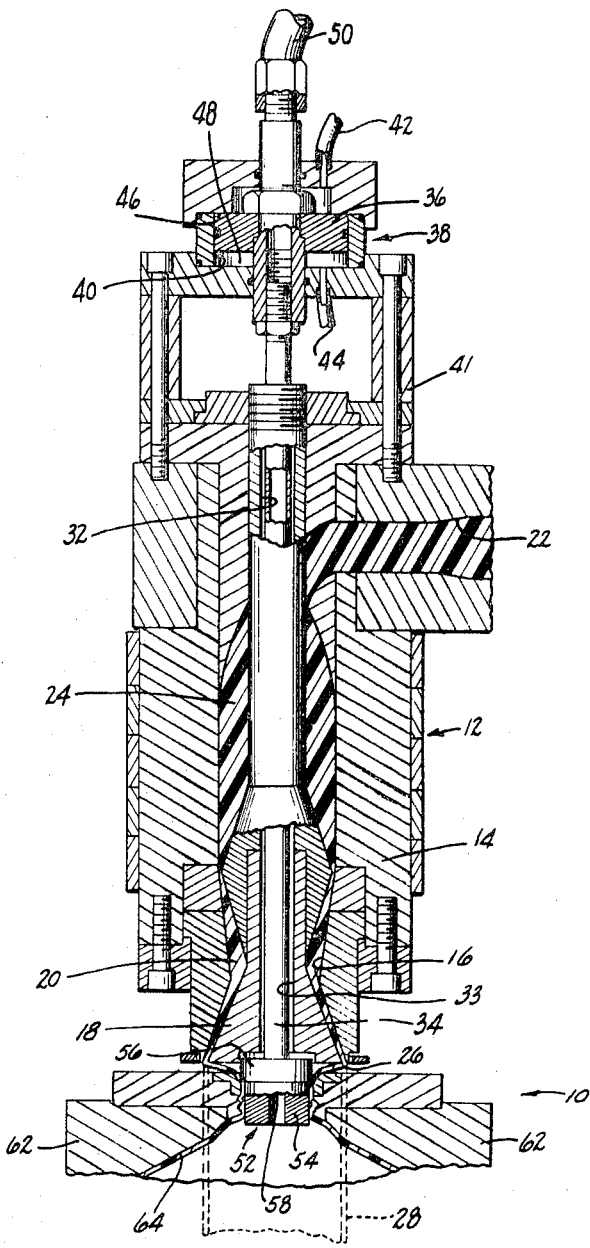
FIGURE 1 is a vertical sectional view of the apparatus of this invention showing the apparatus in its position during expansion of the parison into conformity with the mold cavity.

With reference to the drawing, the apparatus of this invention, indicated generally at 10, is illustrated in FIG. 1 as including an upright die head 12 which consists of a body 14 formed with an axial opening 16 and having a vertically extending mandrel 18 positioned in the opening 16 so as to form therewith an annular passage 20 in the die head 12. The passage 20 communicates at its upper end with a lateral supply passage 22 which is connected to any suitable extruder equipment (not shown), such as is illustrated in patent application Ser. No. 404,-759, filed Oct. 19, 1964, now Patent No. 3,335,457, issued Aug. 15, 1967, and owned by the assignee of this application, capable of forcing heated plastic 24 in a semi-fluid condition, at timed intervals, through the passage 22. The passage 20 terminates at its lower end in an annular discharge orifice 26 so that when heated plastic in a semi-fluid condition is forced downwardly through the passage 20 and out the orifice 26, a downwardly extending tubular parison 28, of expandible plastic, is formed.

An upright tubular member 30 extends vertically as an upper extension of the mandrel 18 and has an inner wall 32 which constitutes an upward extension of the inner wall 33 of mandrel 18. An elongated blow pin 34 extends vertically through the tubular member 30 in a clearance relation with the inner walls 32 and 33 and is attached at its upper end to the piston 36 in a piston and cylinder assembly 38. The assembly 38 is mounted on a frame 41 secured to the upper end of the die head 12 at a position such that the blow pin 34 is substantially axially aligned with the die head discharge orifice 26. The assembly 38 includes a cylinder 40, in which the piston 36 is mounted for up and down movement, and the cylinder 40 is provided at its upper and lower ends with fluid inlet and outlet lines 42 and 44, respectively. As a result, the piston 36 is operable to move the blow pin 34 up and down between a lower position, illustrated in solid lines in FIG. 2 and an upper position illustrated in FIGS. 1 and 3. The piston 36 is shown in FIG. 1 in its upper position in which it is engaged with the cylinder top wall 48, and to move the blow pin 34 downwardly to its lower position, fluid is supplied to the cylinder 40 through the line 42 so as to move the piston 36 against the cylinder bottom wall 46. To return the piston 36 to its lower position fluid is supplied to line 42.

Figure 5:
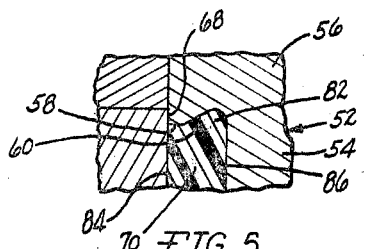
FIGURE 5 is a fragmentary enlarged sectional view illustrating the shape of a portion of the blow pin head which compacts and trims the container neck in the apparatus of this invention.

The blow pin 34 is hollow, so that it is of substantially tubular shape, and is connected at its upper end to a flexible conduit 50 which is connected to a suitable supply of fluid, such as air, under pressure. At its lower end, the blow pin 34 is provided with an enlarged head 52 which is of a "stepped" construction. By "stepped"

construction is meant that the head 52 has a lower portion 54 and an upper portion 56 which is of a larger diameter than the lower portion 54. The head 52 is of substantially cylindrical wall construction and is formed with a downwardly facing surface or shoulder 58 (FIGS. 2 and 5) at the juncture of the portions 54 and 56. As shown in FIG. 5, the shoulder 58 is formed on its radially inner side with a recess or groove 60 for a purpose to appear presently.

Figure 2:
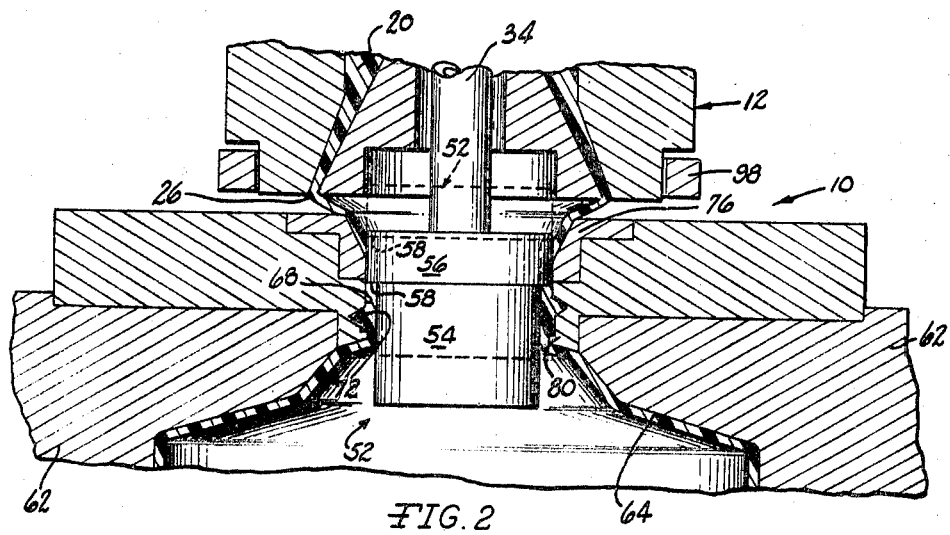
FIGURE 2 is an enlarged fragmentary sectional view, illustrated simliarly to FIG. 1, showing the apparatus of this invention in neck compacting and trimming position in solid lines and in a position immediately prior to neck compacting and trimming in broken lines.
Figure 3:
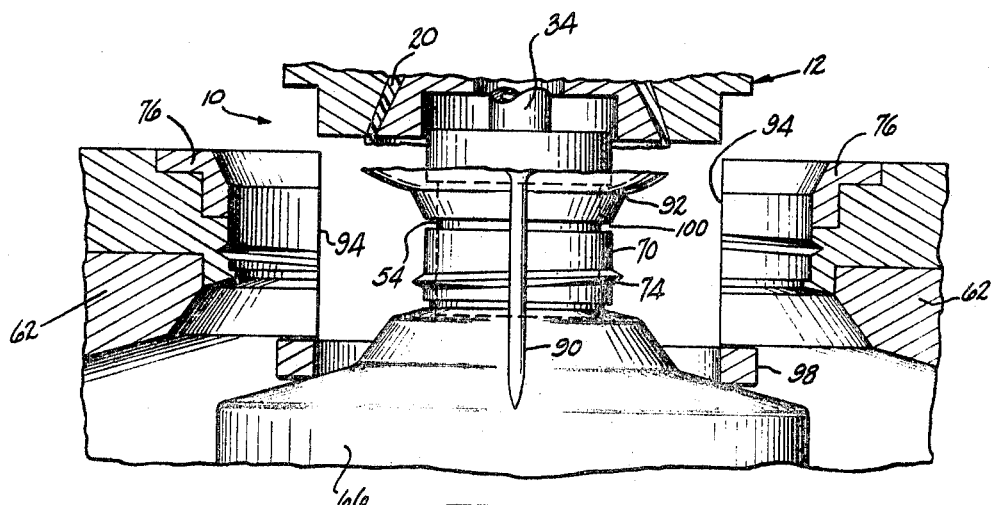
FIGURE 3 is a fragmentary sectional view, illustrated similarly to FIG. 2, showing the apparatus of this invention in position immediately following neck compacting and trimming, and illustrating the mold in open position with the blown container shown in elevation partially stripped from the apparatus of this invention.
Figure 4:
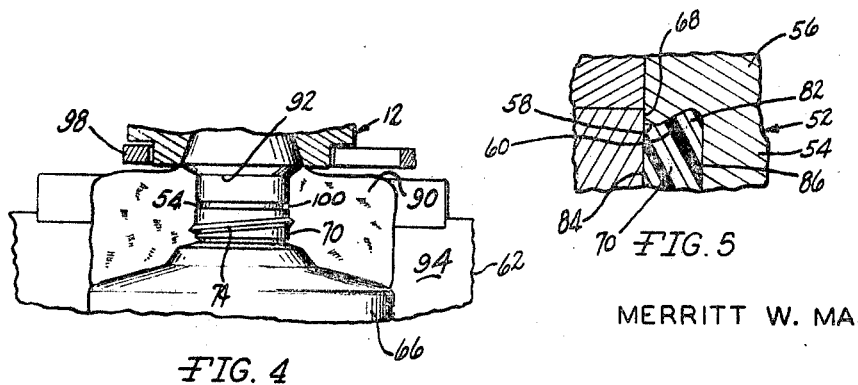
FIGURE 4 is a view similar to FIG. 3, but taken at 90° relative thereto, showing the molded container in elevation prior to stripping.

A pair of mold sections 62 (FIGS. 2 and 3) are positioned below the die head 12 so as to be in close proximity to the discharge orifice 26. The mold sections 62 are mounted for horizontal movement between their spaced apart positions shown in FIG. 3 and engaged positions shown in FIGS. 1 and 2 in which the mold sections 62 define a mold cavity 64 of a shape corresponding to the desired shape of the plastic bottle 66, an upper portion of which is illustrated in FIGS. 3 and 4. Any suitable apparatus, such as that illustrated in the above-identified copending application, can be used for moving the mold sections 62 between the mold open position shown in FIG. 3 and the mold closed position shown in FIGS. 1 and 2. The mold cavity 64 is shaped so that it has an upwardly extending substantially cylindrical wall portion 68 in which the neck 70 of the container 66 is formed. The wall 68 is formed with a helical groove 72 so as to provide a thread 74 on the container neck 70. The mold sections 62 are positioned so that the mold cavity neck portion 68 is substantially axially aligned with the axis of the discharge orifice 26 and the blow pin head 52. The portions 76 of the mold sections 62 above the neck 68 are sloped radially outwardly and upwardly away from the upper end of the mold cavity neck portion 68.

In the apparatus 10 of this invention, the position of the blow pin head 52 relative to the mold neck portion 68 during the various stages of forming of the container 66 is important for reasons which will more clearly appear hereinafter. As best appears in FIGS. 1 and 2, during forming of the parison 28 and during expanding or blowing of the parison 28 into conformity with the mold cavity 64, the blow pin head 52 is in the "blow position" in which the shoulder 58 is above the mold cavity neck portion 68 as illustrated in FIG. 1 and as shown in broken lines in FIG. 2. As shown in FIG. 2, the blow pin head 52 is subsequently moved downwardly so as to move the shoulder 58 into the mold cavity neck portion 68. This lower position of the blow pin head 54 is sometimes referred to as the "compacting and trimming position" because during movement of the head 52 to this position, the plastic in the container neck 70 is compacted and trimmed off from the plastic in the parison 28 above the cavity neck portion 68. This compacting and trimming is accomplished as a result of the forming of the larger blow pin head portion 56 so that it is of substantially the same diameter as the mold cavity neck portion 68. In other words, there is substantially no clearance between the blow pin head portion 56 and the mold cavity neck portion 68 during movement of the head portiton 56 into the cavity portion 68. As a result, the plastic which forms the container neck 70 is separated or sheared off from the plastic above the mold wall 68 during downward movement of the blow pin head portion 56.

In the operation of the apparatus 10 of this invention, assume that the piston 36 in the hydraulic cylinder assembly 38 is in the upper position shown in FIG. 1 so that the shoulder 58 on the blow pin head 52 is above the mold cavity neck portion 68. Assume further that plastic has been forced through the die head discharge orifice 26 so as to form the tubular parison 28 while the mold sections 62 are spaced apart, and that the mold sections 62 have been moved into their engaged positions shown in FIGS. 1 and 2 in which they cooperate to form the mold cavity 64 and pinch and close the lower end of the parison 28 (not shown) as is conventional practice. Air is then supplied to the blow pin 34 through the flexible conduit 50 so as to expand or blow the parison 28 into conformity with the mold cavity 64 to form the plastic bottle 66.

As shown in FIG. 2, during the supply of expanding air to the mold 64, the blow pin head 52 is positioned so that the shoulder 58 is spaced from the upper mold portion 76 a distance corresponding substantially to the wall thickness of the parison 28. As a result, the blow pin head 52 in its blow position cooperates with the portion of the parison above the mold cavity 64 to plug the upper end of the mold cavity 64 and prevent escape of blowing air therefrom. After the expiration of a predetermined time period sufficient to enable the plastic forming the container 64 to partially cool and solidify, fluid is supplied to the cylinder assembly 38 so as to move the blow pin head 52 downwardly to its compacting and trimming position shown in FIG. 2.

During downward movement of the shoulder 58, it forces plastic downwardly in the mold cavity neck portion 68. This plastic is prevented from flowing radially inwardly of the neck portion 68 by the reduced diameter portion 54 of the blow pin head 52. This portion of the head 52 corresponds substantially to the desired inner diameter of the container neck 70. Furthermore, this plastic is effectively blocked against flow into the main body of the mold cavity 64 by an annular radially inwardly extending projection 80 formed on the mold sections 62 so that it faces the shoulder 58. Consequently, the blow pin head portion 54 and the projection 80, which functions as a dam, cooperate with the blow pin shoulder 58 to insure a compacting of the plastic in the mold neck portion 68 and to insure flow of this plastic into the thread forming groove 72. In addition, during downward movement of the shoulder 58, it effectively separates plastic in the mold neck portion 68 from the plastic in the parison 28 since there is no space for this plastic between the blow pin upper portion 56 and the mold cavity neck portion 68.

It can thus be seen that by virtue of the construction of the blow pin head 52 with the different diameter portions 54 and 56 and the shoulder 58, the neck 70 of the container 66 is compacted and trimmed as an incident to downward movement of the blow pin head 52. As shown in FIG. 5, as a result of the provision in the shoulder 58 of the groove 60, the upper end of the container neck 70 is formed with an upwardly extending projection 82 on its radially inner side. In other words, the neck 70 is of progressively increasing height from its radially outer side 84 to its inner side 86. This construction is advantageous because when the container 66 cools, it contracts to a greater extent on its inner surface than it does on its outer surface. When this contraction occurs, the initial provision of the projection 82 on the neck 70 insures a relatively flat upper surface on the neck 70, to facilitate sealing of the neck 70 with a cap (not shown) which is subsequently applied to the container neck 70.

Air is then exhausted from the interior of the molded container 66 through the blow pin 34, and the cylinder assembly 38 is operated to move the blow pin head 52 upwardly to return it to its blow position shown in broken lines in FIG. 2, in which position the blow pin head 52 is in readiness for the next bottle forming sequence. The mold sections 62 are then moved apart as shown in FIG. 3 at which time the molded and trimmed container 66 is still attached to the heated plastic 24 in the die head 12 by the unused portion of the parison 28 which forms flash indicated at 90 and 92 in FIGS. 3 and 4. The flash 90 is formed as an incident to the movement of the mold sections 62 from their spaced apart positions to their closed positions. Since the parison 28 is of a larger diameter than the upper end of the mold cavity 64, portions of the parison 28 are flattened between the surfaces 94 on the mold sections 62 which engage when the molds are moved together. This flattened plastic subsequently cools and forms the flash 90.

During movement of the mold sections 62 away from each other, there is a tendency for the molded bottle 66 to adhere to one or the other of the mold sections 62. However, as shown in FIG. 3, during such movement of the mold sections 62 away from each other, the portion 54 of the blow pin head 52 remains positioned within the neck 70 of the bottle 66. As a result the blow pin head 52 effectively restrains the container 66 from moving with either of the mold sections 62. Once the mold sections 62 have been moved to fully spaced-apart positions, a stripper bracket 98 (FIG. 3) normally positioned around the lower end of the die head 12 is moved downwardly into engagement with the top wall of the container 66 so as to force it downwardly and tear it away from the heated semi-fluid plastic 24 in the die head 12.

The resulting container 66 is encumbered with the flash 90 formed between the mold sections 62 and the additional flash 92 formed by the portion of the parison 28 which extended between the die head discharge orifice 26 and the mold neck portion 68. All of this flash is separated from the upper end of the container neck 70 by a narrow space 100 resulting from the trimming action of the blow pin head 52. At the edges of the portion of the mold cavity 64 in each mold section 62, the section 62 is formed with a relatively sharp edge to enable the flash 90, with the flash 92 connected thereto, to be easily broken off from the molded container 66. After the container 66 has been stripped from the die head 12, as shown in FIG. 3, this flash 90 and 92 is sufficiently cool and rigid that at that time it can be readily manually or machine broken off from the container 80.

As soon as the stripper bracket 98 is returned, the apparatus 10 is in condition for repeating the above sequence of steps. This sequence is then continuously repeated to provide for the continuous molding and neck compacting and trimming of containers 66 with the apparatus 10.

From the above description it is seen that this invention provides apparatus 10 which is capable of forming neck trimmed blow molded plastic containers in which the plastic in neck is compacted during the molding operation. This is accomplished without materially increasing the cost of the blow molding apparatus and without increasing the blow molding cycle time. Consequently, when the bottles 66 come from the apparatus 10, they need only have the flash 90 and 92 removed and they are then ready for filling without the necessity for any further operations.

It will be understood that the apparatus for compacting and trimming necks in blow molded containers which is herein disclosed and described is presented for purposes of explanation and illustration and is not intended to indicate limits of the invention, the scope of which is defined by the following claims.

What is claimed is:

1. In blow molding apparatus, a die head having an annular discharge orifice for extruding plastic material in a heated semi-fluid condition, means forming a mold located adjacent to said discharge orifice having a main cavity terminating at one end in a neck cavity which is substantially coaxial with said orifice, a blow pin extending axially through said orifice for supplying air to said main cavity, said blow pin having an axis substantially aligned with the axis of said neck cavity and a head formed with a shoulder extending transversely of said axis and having an outer diameter substantially equal to the diameter of said neck cavity and an inner diameter slightly less than the inner diameter of said neck cavity, and means for moving said blow pin head in a direction so that said shoulder is moved from outside said neck cavity inward toward said main cavity into said neck cavity.

2. In blow molding apparatus, a die head having an annular downwardly directed discharge orifice for extruding plastic material in a heated semi-fluid condition, means forming a mold having a main cavity terminating at one end in an upwardly extending neck cavity which is substantially coaxial with said orifice and is located below said orifice, an elongated blow pin extending axially through said orifice for supplying air to said main cavity, said blow pin having an axis substantially aligned with the axis of said neck cavity and a head formed with a downwardly facing shoulder extending transversely of said axis and having an outer diameter substantailly equal to the diameter of said neck cavity and an inner diameter slightly less than the inner diameter of said neck cavity, said blow pin being suspended from said die head, and means for moving said blow pin head in a direction so that said shoulder is moved from outside said neck cavity inwardly toward said main cavity to a position within said neck cavity.

3. In apparatus for blow molding a container having an upwardly extending neck, said apparatus comprising annular means for forming a downwardly extending parison having an open upper end, mold halves mounted for movement from positions on opposite sides of said parison to engaged positions in which said mold halves close the parison below the upper end thereof and define a mold cavity having an upwardly extending neck portion, an upright hollow blow pin extending axially through said annular means having a head on the lower end thereof extended into said parison and into said mold cavity neck portion, said blow pin head being of substantially cylindrical shape and having an enlarged diameter upper end portion and a shoulder at the lower end of said portion, means for moving said blow pin up and down so as to move said head between a blow position in which said enlarged head portion is entirely above said cavity neck portion and a neck compacting position in which said shoulder is within said neck portion, said enlarged head portion being of a diameter approximately equal to the inner diameter of said cavity neck portion so that during downward travel of said shoulder into said neck portion a portion of said parison therein is compacted to form said container neck and the plastic in said cavity is separated from the portion of said parison above said neck.

4. In apparatus for concurrently blow molding and trimming the upper open end of a container, annular means for forming a downwardly extending parison, a blow pin extending axially through said annular means downwardly into said parison and having an enlarged head on the lower end thereof of a shape to form a downwardly facing surface thereon, means forming a mold cavity having a substantially cylindrical neck portion located in substantially axial alignment with said head said cavity being of a shape corresponding to the desired final shape of said container and being positioned around said parison at a position such that said neck portion is located below said shoulder, means for supplying a blowing fluid to said parison through said blow pin head, means for moving said blow pin downwardly so as to move said surface downwardly relative to said mold, said surface and said mold cavity neck portion being of substantially the same size to provide for a separation of the plastic in said neck portion from the plastic above said neck portion by said surface in response to said movement.

5. In apparatus for concurrently blow molding and trimming the upper open end of a container, annular means for forming a downwardly extending parison of plastic material, a blow pin extending axially through said annular means downwardly into said parison and having a head on the lower end thereof and a downwardly facing shoulder structure thereon, means forming a mold cavity having a substantially cylindrical neck portion located in substantially axial alignment with said head of a dimension to permit penetration thereof by said shoulder structure, said cavity being of a shape corresponding to the desired final shape of said container and being positioned around said parison at a position such that said neck portion is located below said shoulder structure, means for supplying a blowing fluid to said parison through said blow pin head, means on said head located below said shoulder structure extending into said neck portion, means on said head cooperable with said parison and said mold cavity forming means to close the upper end of said mold cavity during supply of blowing fluid to said blow pin, means for moving said shoulder structure downwardly relative to said mold cavity forming means, said shoulder structure and said mold cavity forming means being relatively proportioned to provide for a separation of the plastic material in said mold cavity from the plastic material in said parison above said neck portion by the penetrating action of said shoulder structure in response to said movement and to provide for a pushing of plastic material from said parison downwardly into said neck portion.

6. In apparatus for concurrently blow molding and trimming the upper open end of a container, annular means for forming a downwardly extending parison of plastic material, a blow pin extending axially through said annular means downwardly into said parison and having a head on the lower end thereof and a downwardly facing shoulder structure thereon, means forming a mold cavity having a substantially cylindrical neck portion located in substantially axial alignment with said head of a dimension to permit penetration thereof by said shoulder structure, said cavity being of a shape corresponding to the desired final shape of said container and being positioned around said parison at a position such that said neck portion is located below said shoulder structure, means for supplying a blowing fluid to said parison through said blow pin head, means on said head located below said shoulder structure extending into said neck portion, means on said head cooperable with said parison and said mold cavity forming means to close the upper end of said mold cavity during supply of blowing fluid to said blow pin, means for moving said shoulder structure downwardly relative to said mold cavity forming means, said shoulder structure and said mold cavity forming means being relatively proportioned to provide for a separation of the plastic material in said mold cavity from the plastic material in said parison above said neck portion by the penetrating action of said shoulder structure into said neck portion in response to said movement and to provide for a pushing of plastic material from said parison downwardly into said neck portion, and means on said mold cavity means forming an annular dam at the lower end of said neck portion to block the flow of plastic material downwardly from said neck portion.

7. In apparatus for concurrently blow molding and trimming the open upper end of a plastic container having a neck, a vertically extending die head having an annular passage for heated plastic in a semi-fluid condition terminating in a downwardly opening annular discharge orifice, means forming a vertically extending opening in said die head which is substantially coaxial with said orifice and has a side wall, a hollow vertically extending blow pin extending through said die head opening in a clearance relation with said side wall, means located above said die head and connected to the upper end of said blow pin for moving said blow pin up and down in said opening, means for supplying fluid to the interior of said blow pin, mold means located below said discharge orifice forming a mold cavity having an upwardly extending cylindrical wall for forming the neck of said container, and means on the lower end of said blow pin forming a surface which is substantially coaxial with said mold cavity cylindrical wall and is of substantially the same diameter, said blow pin on downward movement thereof being operable to move said surface into said cavity in substantial engagement with said wall so as to separate plastic therein and push plastic downwardly therein and an annular dam on said mold means at the lower end of said cylindrical wall projecting radially inwardly of said wall.

8. In apparatus for concurrently blow molding and trimming the open upper end of a palstic container having a neck, a vertically extending die head having an annular passage for heated plastic material in a semi-fluid condition terminating in a downwardly opening annular discharge orifice, means forming a vertically extending opening in said die head which is substantially coaxial with said orifice and has a side wall, a hollow vertically extending blow pin extending through said die head opening in a clearance relation with said side wall, means for supplying fluid to the interior of said blow pin, mold means located below said discharge orifice forming a mold cavity having an upwardly extending cylindrical wall for forming the neck of said container, and means on the lower end of said blow pin forming a compacting shoulder which is substantially coaxial with said mold cavity cylindrical wall and is of substantially the same size, and means operable to move said shoulder into said cavity in substantial engagement with said wall so as to separate plastic material therein and push plastic material downwardly therein.

9. In apparatus for concurrently blow molding and trimming the open upper end of a plastic container having a neck, a vertically extending die head having an annular passage for heated plastic in a semi-fluid condition terminating in a downwardly opening annular discharge orifice, means forming a vertically extending opening in said die head which is substantially coaxial with said orifice and has a side wall, a hollow vertically extending blow pin extending through said die head opening in a clearance relation with said side wall, fluid actuated piston and cylinder means located above said die head and connected to the upper end of said blow pin for moving said blow pin up and down in said opening, means for supplying fluid to the interior of said blow pin, mold means located below said discharge orifice forming a mold cavity having an upwardly extending cylindrical wall for forming the neck of said container, said cylindrical wall having a groove therein for forming a thread on said neck, and means on the lower end of said blow pin forming a compacting shoulder which is substantially coaxial with said mold cavity cylindrical wall and is of substantially the same size, said piston and cylinder means being operable to move said shoulder into said cavity in substantial engagement with said wall so as to separate plastic therein and push plastic downwardly therein and into said thread groove.

10. In apparatus for blow molding a container having an upwardly extending neck, said apparatus comprising means for forming a downwardly extending parison having an open upper end, mold sections mounted for movement from positions on opposite sides of the formed parison to engaged positions in which said mold sections close the parison below the upper end thereof and define a mold cavity having an upwardly extending neck portion, an upright hollow blow pin having a head on the lower end thereof extended into said parison and into said mold cavity neck portion, said blow pin head being of substantially cylindrical shape and having an enlarged diameter upper end portion and a reduced diameter lower portion and an annular surface at the juncture of said portions, means for moving said blow pin up and down so as to move said head between a blow position in which said enlarged head portion is entirely above said cavity neck portion and a neck compacting position in which said surface is within said neck portion, said enlarged head portion being of a diameter approximately equal to the inner diameter of said cavity neck portion so that during downward travel of said surface into said neck portion a portion of said parison therein is compacted to form said container neck and the plastic in said cavity is separated from the portion of said parison above said neck, said annular surface being inclined radially inwardly and upwardly so as to form the upper end of said container neck such that the radially inner side is disposed above the radially outer side for shrinkage to the level of said radially outer side on cooling of said container.

11. In blow molding apparatus for forming hollow articles, a die head having an annular discharge orifice for discharging plastic material in the shape of a tube, means forming a mold located adjacent to said discharge orifice having a main cavity terminating at one end in a neck cavity, a blow pin extending through said orifice for supplying air to said main cavity, said discharge orifice, neck cavity and blow pin having a common axis, said blow pin having adjacent to its end a diameter less than the diameter of said neck cavity for defining the internal neck dimension of the blown article, an annular structure associated with said blow pin having a surface extending transversely of said axis for defining the end of the blown articles, said surface having an outer diameter of the diameter of said neck cavity and an inner diameter of the diameter of said end of the blow pin, and means for moving said surface axially from a position outside said neck cavity inwardly into said neck cavity.

References Cited

UNITED STATES PATENTS

| | | | |
|---|---|---|---|
| 2,890,483 | 6/1959 | Soubier | 18—5 |
| 3,224,038 | 12/1965 | Budesheim | 18—5 |
| 3,311,950 | 4/1967 | Strauss | 18—5 |
| 3,009,196 | 11/1961 | Hagen | 18—5 |
| 3,314,106 | 4/1967 | Latreille et al. | 18—5 |

WILBUR L. McBAY, Primray Examiner

U.S. Cl. X.R.

264—98